United States Patent
Kelliher

(10) Patent No.: US 12,475,430 B2
(45) Date of Patent: Nov. 18, 2025

(54) SYSTEM AND METHOD FOR REAL-TIME TRIP AUTOMATION AND EVENT MONITORING FOR SHIPMENTS

(71) Applicant: Carrier Corporation, Palm Beach Gardens, FL (US)

(72) Inventor: John Kelliher, Danvers, MA (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 18/463,670

(22) Filed: Sep. 8, 2023

(65) Prior Publication Data
US 2024/0086827 A1    Mar. 14, 2024

Related U.S. Application Data

(60) Provisional application No. 63/374,950, filed on Sep. 8, 2022.

(51) Int. Cl.
*G06Q 10/0833* (2023.01)

(52) U.S. Cl.
CPC ................ *G06Q 10/0833* (2013.01)

(58) Field of Classification Search
CPC .................................... G06Q 10/0833
See application file for complete search history.

(56) References Cited

U.S. PATENT DOCUMENTS

| | | |
|---|---|---|
| 8,224,562 B2 | 7/2012 | Katzer |
| 10,438,162 B2 | 10/2019 | Sharma et al. |
| 10,467,581 B2 | 11/2019 | Laury et al. |
| 11,243,088 B2 | 2/2022 | Goel |
| 2009/0177513 A1 | 7/2009 | Eckhart et al. |

(Continued)

FOREIGN PATENT DOCUMENTS

| | | |
|---|---|---|
| CN | 112907193 A | 6/2021 |
| CN | 108846612 B | 1/2022 |
| WO | 2021209381 A1 | 10/2021 |

OTHER PUBLICATIONS

Yingjun, Zhang, Shengwei, Xing, Peng, Xu, and Xinquan, Wang, "Shipping Containers of Dangerous Goods Condition Monitoring System based on Wireless Sensor Network," INC2010: 6th International Conference on Networked Computing, Gyeongju, South Korea, 2010, pp. 1-3.*

(Continued)

*Primary Examiner* — Nathan Erb
(74) *Attorney, Agent, or Firm* — Drew Folgmann

(57) ABSTRACT

A system and method for real-time trip automation and event monitoring of shipments is disclosed. The system includes one or more containers, and monitoring devices configured in each container. These monitoring devices monitor the attributes of zones in the container and the location of the container during the trip. Further, a server receives a predefined trip automation rule associated with the container, being defined by the user. The server communicates with the monitoring devices to receive the set of data points pertaining to the location of the containers during the trip. Further, the server confirms and notifies the location and status of the containers by checking the location of the monitoring device, for a predefined number of consecutive data points, within or outside the geofence of the locations.

17 Claims, 5 Drawing Sheets

(56) References Cited

U.S. PATENT DOCUMENTS

| | | | |
|---|---|---|---|
| 2012/0092130 A1* | 4/2012 | Chung | G06Q 10/08 340/10.1 |
| 2012/0235791 A1* | 9/2012 | Donlan | G06Q 10/0833 340/10.1 |
| 2018/0025294 A1 | 1/2018 | Hugla | |
| 2018/0192241 A1* | 7/2018 | Jernigan | G01S 19/13 |
| 2018/0374039 A1* | 12/2018 | Walden | G06Q 10/0875 |
| 2019/0242716 A1 | 8/2019 | N et al. | |
| 2019/0370747 A1 | 12/2019 | Feng et al. | |
| 2020/0095059 A1* | 3/2020 | Skaaksrud | A62C 3/002 |
| 2020/0202289 A1* | 6/2020 | Lau | G06F 21/64 |
| 2020/0202296 A1 | 6/2020 | Sandberg et al. | |
| 2020/0242549 A1 | 7/2020 | Daoura et al. | |
| 2021/0014653 A1 | 1/2021 | Klein | |
| 2021/0058462 A1* | 2/2021 | Skaaksrud | H04L 67/12 |
| 2021/0208558 A1* | 7/2021 | Neeld | G06Q 10/0833 |
| 2021/0295257 A1* | 9/2021 | Perneti | G06Q 50/40 |
| 2021/0357887 A1* | 11/2021 | Carvalho | H04L 63/104 |
| 2022/0147886 A1 | 5/2022 | Wernze et al. | |
| 2022/0156693 A1 | 5/2022 | Singh et al. | |
| 2022/0165161 A1 | 5/2022 | Khandekar et al. | |
| 2023/0186230 A1* | 6/2023 | Paul | G06Q 10/0838 705/333 |

OTHER PUBLICATIONS

Extended European Search Report received for EP Application No. 23195800.0, mailed on Nov. 17, 2023, 9 Pages.

\* cited by examiner

SYSTEM AND METHOD FOR REAL-TIME TRIP AUTOMATION AND EVENT MONITORING FOR SHIPMENTS

CROSS REFERENCE TO RELATED APPLICATIONS

This application claims the benefit of U.S. Provisional Patent Application No. 63/374,950 filed on Sep. 8, 2022, which is incorporated by reference herein in its entirety.

BACKGROUND

This invention relates to the field of trip monitoring systems and methods, and more particularly, to a system and method for real-time automation and event monitoring for outbound shipments.

Existing systems support inbound trip monitoring by providing features that allow users to manually create trips and monitor events or require integration with external systems to automatically create trips. However, based on the variability and the high number of intermediate stops associated with outbound shipments, such as trips from a distribution hub to one or more customers, manual creation of trips is not feasible for outbound shipments. Moreover, there is no provision for real-time and zone-wise monitoring of the conditions of containers used for outbound shipments, which is desirable for quality assurance.

There is, therefore, a need to provide a solution that allows users to easily and quickly define attributes for outbound shipments (containers, locations), and further allows automatic creation and processing of trips, and enables automated event monitoring for shipments in real-time without being required to integrate to external systems.

SUMMARY

Described herein is a system for real-time trip automation and event monitoring of shipments is disclosed. The system comprises one or more containers associated with a shipment, and one or more monitoring devices assigned to and installed in each of the containers, wherein each monitoring device is configured to: monitor attributes of one or more zones in the corresponding containers, and monitor a location of the corresponding containers. The system further comprises a server in communication with the one or more monitoring device, wherein the server is configured to receive a set of data packets pertaining to a predefined trip automation rule associated with a trip for the shipment, wherein the predefined trip automation rule comprises one or more predefined locations comprising an origin, one or more intermediate stops, and a destination associated with the trip, and a geofence of a predefined radius around each of the one or more locations, monitor a set of data points pertaining to the location of the one or more containers being monitored by the corresponding monitoring devices during the trip, and confirm and notify the location of the one or more containers by checking the location of the corresponding monitoring device for a predefined number of consecutive data points among the monitored set of data points.

In one or more embodiments, the server is configured to determine a halt time of the one or more containers at any of the one or more locations by calculating a total time spent by the corresponding monitoring device across the data points identified within the geofence of the corresponding location.

In one or more embodiments, the server confirms the location of the one or more containers to be at one of the one or more locations during the trip when the predefined number of consecutive data points among the monitored set of data points are found to be within the geofence of the corresponding locations.

In one or more embodiments, the server determines the one or more containers to be in a transit state when the predefined number of consecutive data points among the received set of data points are found to be outside the geofence of the one or more locations.

In one or more embodiments, the predefined trip automation rule further comprises: a unique serial number associated with the one or more containers and the corresponding monitoring device assigned for the shipment, and a threshold range of the attributes for the one or more zones within the one or more containers.

In one or more embodiments, the server is configured to receive messages pertaining to the monitored location and attributes data from the one or more monitoring device, check and validate the trip automation rule upon receiving each of the messages from the one or more monitoring devices, by comparing the unique identification number associated with the one or more containers and the corresponding monitoring device, and follow the predefined trip automation rule upon a positive matching of the unique identification number associated with the one or more containers and the corresponding monitoring device.

In one or more embodiments, the server skips following the predefined trip automation rule and generates an alert signal when the message is received from a monitoring device that is on a container that is not defined in the trip automation rule.

In one or more embodiments, the system comprises one or more mobile devices associated with one or more registered users, in communication with the server and the monitoring devices, wherein the one or more mobile devices allow the one or more registered users to monitor the attributes of the one or more zones in the one or more containers, and monitor the location and a corresponding time stamp of the one or more containers being confirmed and notified by the server during the trip.

In one or more embodiments, the server is configured to transmit: the confirmed location and the corresponding time stamp of the one or more containers to the one or more mobile devices, the monitored attributes of the one or more zones of the one or more containers to the one or more mobile devices in real-time, and a set of alarm signals to the one or more mobile devices when the monitored attributes of one or more zones within the corresponding containers exceed the threshold range for a predefined time.

In one or more embodiments, the monitoring device comprises: a positioning unit to monitor the location of the monitoring device at the predefined interval and/or in real-time, one or more sensors to monitor the attributes of the one or more zones of the one or more containers, and a communication unit operatively coupled to the positioning unit and the one or more sensors, wherein the communication unit communicatively couples the monitoring device to the server.

In one or more embodiments, the attributes associated with the one or more zones comprises one or more of temperature, light, humidity, gas composition, and pressure.

Also described herein is a method for real-time trip automation and event monitoring of shipments is disclosed. The method includes the steps of defining a trip automation rule for a shipment by assigning one or more containers for the shipment, providing one or more predefined locations comprising an origin, one or more intermediate stops, and a destination for the trip, and defining a geofence of a predefined radius around each of the one or more locations. The method further includes the step of monitoring a set of data points pertaining to the location of the one or more containers during the trip, setting a "time at stop" condition to be met for the one or more containers, wherein the "time at stop" condition is confirmed when the one or more containers stop at the one or more predefined locations, and confirming and notifying the location of the one or more containers by checking the location of the corresponding monitoring device for a predefined number of consecutive data points among the monitored set of data points.

In one or more embodiments, the method comprises the step of confirming and notifying the location of the one or more containers by checking the location of the corresponding monitoring device for two consecutive data points among the last ten monitored set of data points of the containers.

In one or more embodiments, the method comprises the step of determining a halt time of the one or more containers at any of the one or more locations by calculating a total time spent by the corresponding monitoring device across the data points identified within the geofence of the corresponding location.

In one or more embodiments, when the predefined number of consecutive data points among the monitored set of data points are found to be within the geofence of one of the one or more locations, the location of the one or more containers is identified and notified to be the corresponding location.

In one or more embodiments, when the predefined number of consecutive data points among the received set of data points are found to be outside the geofence of the one or more locations, the one or more containers is identified and notified to be departed from the stop and in a transit state.

In one or more embodiments, the method comprises the step of receiving messages pertaining to the location data of the containers, and checking and validating the trip automation rule upon receiving each of the messages, wherein the trip automation rule is validated by comparing a unique identification number associated with the one or more containers and the corresponding monitoring device assigned for the shipment.

In one or more embodiments, the method comprises the steps of following the predefined trip automation rule upon a positive matching of the unique identification number associated with the one or more containers and the corresponding monitoring device, and skipping following the trip automation rule and generating an alert signal when the message is received from a monitoring device that is on a container which is not defined in the trip automation rule.

In one or more embodiments, the method comprises the steps of monitoring one or more attributes of one or more zones in the one or more containers, and generating a set of alarm signals when the monitored attributes of one or more zones within the corresponding containers exceed a threshold range for a predefined time, wherein the threshold range and the corresponding predefined time are predefined in the trip automation rule.

In one or more embodiments, the method comprises the steps of: transmitting the confirmed location and a corresponding time stamp of the one or more containers to one or more mobile devices associated with the user in real-time or at a predefined time interval, and transmitting the monitored attributes of the one or more zones of the one or more containers to the one or more mobile devices in real-time or at the predefined time interval.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

Figure 1:
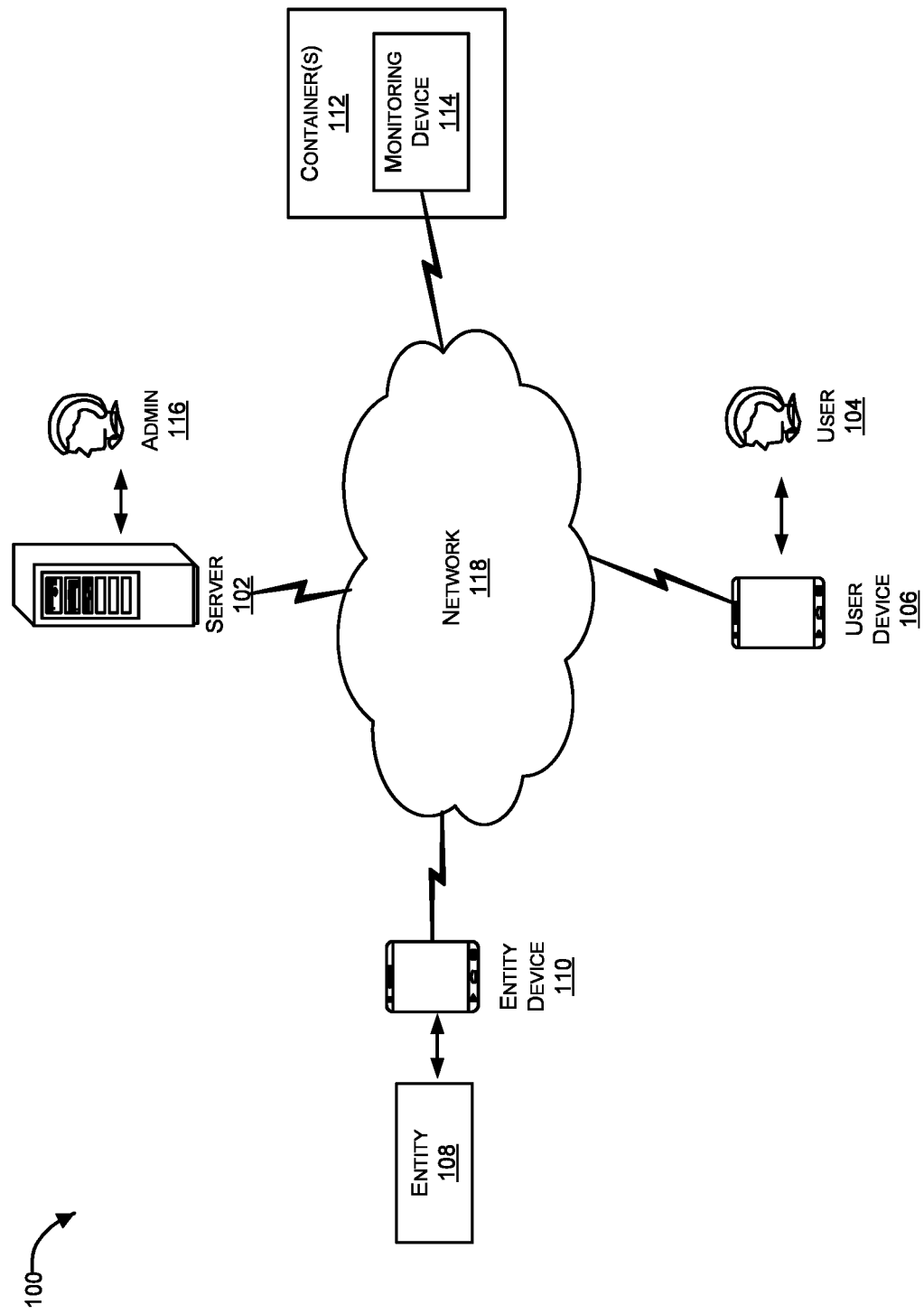
FIG. 1 is a schematic diagram illustrating an exemplary network architecture of the system for real-time automation and event monitoring for outbound shipments in accordance with one or more embodiments of the invention.

Referring to FIG. 1, an exemplary embodiment of the network architecture of the system 100 is illustrated. According to network implementation, the system 100 enables real-time automation and event monitoring for outbound shipments. Although the system 100 is explained for outbound shipments, it may be understood that system 100 may also be implemented for inbound shipments. Further, the invention has been explained considering that the system 100 is implemented as a web-application on a server 102, it may be understood that system 100 may also be implemented in a variety of computing systems, such as a laptop computer, a desktop computer, a notebook, a workstation, a server, a network server, a cloud-based environment and the like. It would be appreciated that the system 100 is accessed by multiple users 104 (collectively referred to as users 104, hereinafter), through one or more user mobile devices 106 (collectively referred to as user devices 106, hereinafter), or applications residing on the user devices 106. Users 104 can be an individual person, or a group of persons, or an organization, and the like, which require the outbound shipment service for their shipments through the system.

The system 100 is further accessed by multiple entities 108 (collectively referred to as entities 108, hereinafter) associated with the outbound shipment service provider, through one or more entity mobile devices 110 (collectively referred to as entity devices 110, hereinafter), or applications residing on the entity devices 110. The entity 108 is a registered person or a group of registered persons associated with the outbound shipment service provider. The entities 108 may be associated with a packaging team, transportation team, maintenance team, quality monitoring team, operations team, and the like associated with the outbound shipment service provider. Further, the system 100 is accessed by an administrator 116 (admin) at the server end 102.

In one or more embodiments, the system 100 registers the users and the entities as registered users 104 and registered entities 108, upon positive verification of their registered mobile devices 106, 110, respectively, by the admin 116 at the server end. The system 100 requests and receives, upon a first communicative coupling (or first-time registration) of the user's mobile devices 106 with the server 102, one or more details of the corresponding user from the mobile devices 106 of the users 104, and correspondingly registers the users as the registered user 104 upon positive verification of one or more corresponding user details. Similarly, the system 100 requests and receives, upon a first communicative coupling (first-time registration) of the entity mobile devices 110 with the server 102, the details of the corresponding entity 108 from the entity mobile devices 110, and correspondingly registers the entities as the registered entity 108 upon positive verification of the corresponding entity details. In an exemplary embodiment, the details of users 104 and entities 108 include name, photo, age, gender, mobile number, location, and biometrics details of the registered users, but not limited to the like. Users 104 and entities 108 can access the system 100 through a mobile or web application residing on their mobile device 106, 110 or through a website. In an embodiment, the mobile devices 106, 110 associated with the users 104, and the entities 108 can be a desktop, smartphone, tablet, laptop, hand-held computing devices, and the like.

The system 100 further involves multiple monitoring devices 114 (collectively referred to as monitoring devices 114, herein) that are configured in one or more containers 112 (collectively referred to as containers 112, herein) assigned by the shipment service provider for the outbound shipment requested by the users 104. These monitoring devices 114 are configured to monitor the real-time location of the containers 112 and also monitor attributes of different zones within the corresponding containers 112. The container 112 can be a movable container such as a trailer, box truck, and the like, and the zones can be a freezer, cooler, ambient zone, and the like.

In instances, when there is a communication failure between the monitoring device 114 and the server 102 due to being out of network coverage, the monitoring devices 114 store the location and zone attributes data of the container 112 and report it to the server 102 when communication between them is re-established. In some embodiments, when a container 112 has multiple monitor devices 114 installed, there will be multiple incoming messages (signals) reported for the same container. In such a case, automated processing ensures duplicate trips are not created. Additionally, the server 102 assigns captured data from the multiple monitor devices 114 to a singular, in-transit trip that exists for the container 112.

The server 102 is configured to receive a set of data packets pertaining to a predefined trip automation rule associated with a trip for the shipment. The predefined trip automation rule comprises container groups, one or more predefined locations such as an origin, one or more intermediate stops, a destination associated with the trip, a geofence of a predefined radius around each of the locations, alarm conditions for zones of containers, event rules configuration, real-time action requirement, event notification and recipient's configuration, and the likes. The monitoring devices 114 are in a one-way communication with the server 102. The monitoring devices 114 monitors a set of data points pertaining to the location of the containers 112 during the trip and transmits the monitored location data to the server 102 in real-time or at predefined interval. Further, the server 102 confirms and notifies the location of the containers 112 to the users 104 and the entities 108 by checking the location of the corresponding monitoring device 114 for a predefined number of consecutive data points among the monitored set of data points. Furthermore, the monitoring device 114 monitors the attributes of the containers 112 and transmits the monitored attributes data to the server 102. The server 102 is configured to transmit an alert signal to the user device 106 and entity devices 110 when the monitored attributes of the containers 112 exceed the defined threshold values. The detailed operation of the system 100 has been described later in conjunction with FIG. 2.

The mobile devices 106, 110 of the users 104, and entities 108 allow them to configure the predefined trip automation rule for the trip, monitor the attributes of the zones in the containers 112 assigned for the shipment, and monitor the location and a corresponding time stamp of the containers 112 being confirmed and notified by the server 102 during the trip. The server 102 notifies and/or sends alert signals to the mobile devices 106, 110 of the users 104, and entities 108 in form of text messages, emails, and the like.

The system 100 can be operatively coupled to a website and so be operable from any internet-enabled user device and/or entity device. Examples of user devices 106 and entity devices 110 may include, but are not limited to, a smartphone, a portable computer, a personal digital assistant, a handheld device, and a workstation. The user devices 106, entity devices 110, and monitoring devices 114 are communicatively coupled or in communication with server 102 through a network 118.

In one or more implementations, the network 118 can be a wireless network, a wired network or a combination thereof. Network 118 can be implemented as one of the different types of networks, such as intranet, local area network (LAN), wide area network (WAN), the internet, and the like. Further, the network 118 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, network 118 can include a variety of network devices, including transceivers, routers, bridges, servers, computing devices, storage devices, and the like. The network 118 can be a cellular network or mobile communication network based on various technologies, including but not limited to, Global System for Mobile (GSM), General Packet Radio Service (GPRS), Code Division Multiple Access (CDMA), Long Term Evolution (LTE), WiMAX, 5G or 6G network protocols, and the like.

Figure 2:
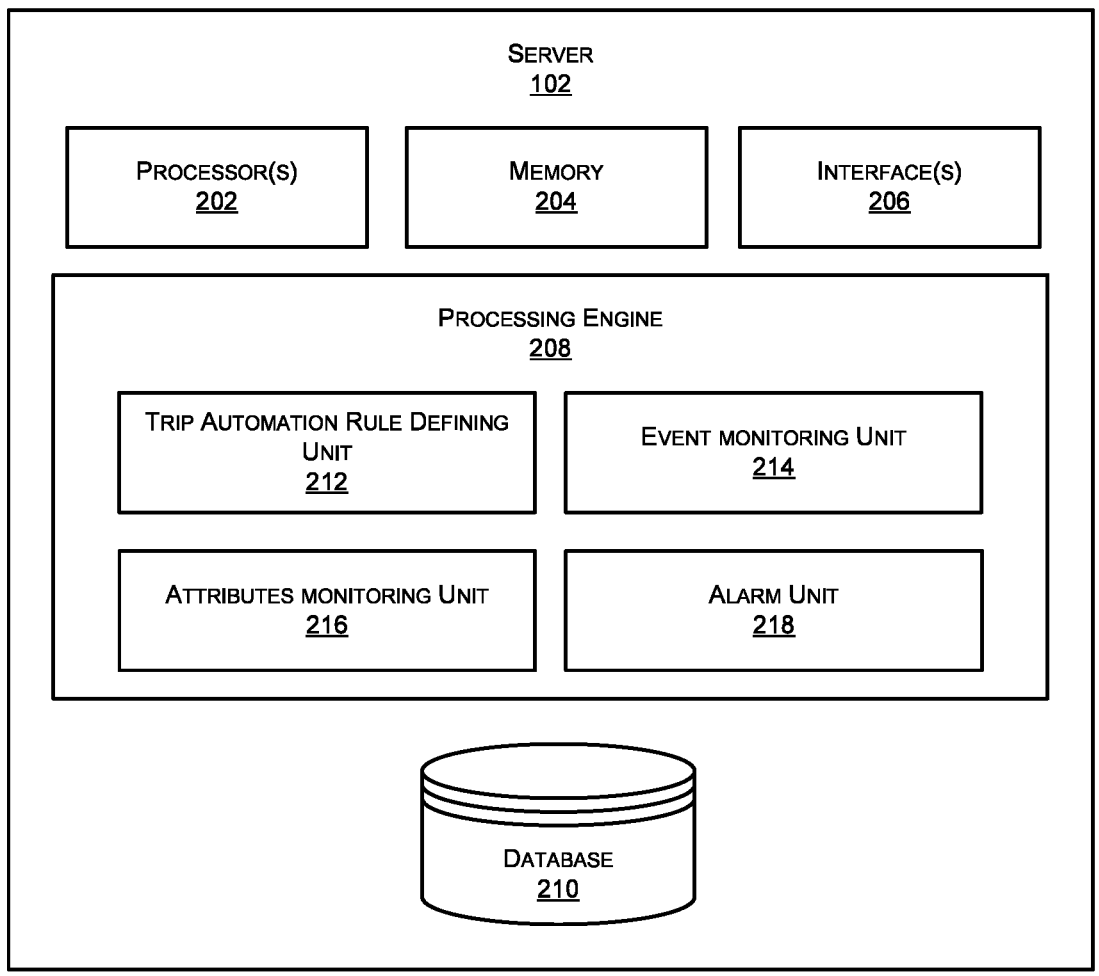
FIG. 2 is a schematic diagram illustrating the functional modules of the server of the system in accordance with one or more embodiments of the invention.

Referring to FIG. 2, the functional modules of server 102 of the system 100 is illustrated. The server 102 comprises one or more processor(s) 202 operatively coupled to a memory 204. The one or more processor(s) 202 may be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in the memory 204 of server 102. The memory 204 may store one or more computer-readable instructions or routines, which may be fetched and executed to create or share the data units over a network service. The memory 204 may comprise any non-transitory storage device including, for example, volatile memory such as RAM, or non-volatile memory such as EPROM, flash memory, and the like.

Server 102 also comprises an interface(s) 206 that may comprise a variety of interfaces, for example, interfaces for data input and output devices, referred to as I/O devices, storage devices, and the like. The interface(s) 206 includes a communication module to facilitate communication of server 102 with the monitoring devices 114, the user devices 106, and entity devices 110, through the network 118. The interface(s) 206 may also provide a communication pathway for one or more internal components or units of the server 102 and with a mobile device of admin 116. Examples of such internal components include, but are not limited to, processing engine(s) 208 and data (database) 210.

The processing engine(s) 208 is implemented as a combination of hardware and programming (for example, programmable instructions) to implement one or more functionalities of the processing engine(s) 208. In the examples described herein, such combinations of hardware and programming may be implemented in several different ways. For example, the programming for the processing engine(s) 208 may be processor-executable instructions stored on a non-transitory machine-readable storage medium, and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, server 102 comprises the machine-readable storage medium storing the instructions and the processing resource to execute the instructions, or the machine-readable storage medium may be separate but accessible to server 102 and the processing resource. In other examples, the processing engine(s) 208 may be implemented by an electronic circuitry. The database 210 may comprise data that is either stored or generated as a result of functionalities implemented by any of the components of the processing engine(s) 208 or system 100.

In an embodiment, the processing engine(s) 208 includes a trip automation rule defining unit 212, an event monitoring unit 214, an attribute monitoring unit 216, an alarm unit 218, and other units (s). Other unit(s) can supplement the functionalities of the processing engine 208 or the server 102.

In an exemplary embodiment, the trip automation rule defining unit 212 enables the server 102 to allow the admin 116 to define or configure a trip automation rule for the shipment. The admin 116 can define or configure the trip automation rule as per their requirements using a desktop application. Further, in some embodiments, the trip automation rule defining unit 212 enables server 102 to allow the users and/or entities to define or configure a trip automation rule for the shipment upon receiving authorization from admin 116. The users 104 and/or entities 108 can define or configure the trip automation rule as per their requirements using their mobile devices 106, 110. The trip automation rule includes, but is not limited to, container zone specification and alarm event conditions, creation of container groups, creation of containers, creation of location groups, creation of geofence around location, event rules configuration, real-time action requirement, event notification and recipient's configuration, and the like.

In an example, for each container to be monitored, alarm conditions can be defined in the trip automation rule for each zone within the container. These conditions can be implemented as per expert guidance or as per the user's unique monitoring requirements. The elements for each zone specification alarm include severity of alarm (information, warning, critical), sensor type to be monitored (temperature, light, $CO_2$, humidity), alarm frequency per trip (once, continuous, reset after raising, reset after acknowledging), alarm type (single, continuous, cumulative, degree minutes, rate of change), alarm threshold in time (days, hours, minutes), threshold type (high or low), sensor threshold (degrees for temperature, and percentage for light, $CO_2$, humidity), and zone specifications variables for each sensor type (low, ideal, high), but not limited to the like.

For each shipment, a container group can be defined in the trip automation rule, which includes a grouping of 1 to N containers, where one container group is created for each logical operations center associated with the shipment and each container is assigned only to a single container group. Further, a monitoring device 114 is assigned to a specific container 112 that is assigned to a specific container group defined in the trip automation rule. The serial number of each container 112 and the assigned monitoring devices 114 for each container are saved in the database 210 of the server 102 for future validation.

Further, a location group is defined in the trip automation rule, which includes a logical grouping of 1 to N locations. A minimum of three distinct location groups must be defined for the trip automation rule, for instance, origin locations are defined as location group type "origin", intermediate locations are defined as location group type "stops", and destination locations are defined as location group type "final destination".

The geofence around the defined locations can also be defined in the trip automation rule. Initially, the location name and address of the defined location are extracted from the user's system record. The system 100 then automatically imports the latitude and longitude coordinates of the defined locations through an address lookup service. Further, the geofence around the defined locations can be defined based on location type. In one exemplary embodiment, a geofence radius of 0.03 miles may be defined for stops and a geofence of 0.5 miles may be defined for origin or destination. Furthermore, the data points to be monitored are defined in a location record stored in a database associated with the server 102. For instance, one consecutive data point for a stop location's arrival, and two consecutive data points for stop location's departure can be defined. Further, two consecutive data points for the stops, and two consecutive data points for the destination can be defined to locate data points for departure.

In addition, event rules are also defined in the trip automation rule. Configurable event rules define the conditions that must be met for a specific event to be triggered by system 100 processing. Whether a trip is manually or automatically created, the system 100 continuously processes and evaluates incoming monitoring device data to determine which event rule conditions have been met and then executes actions for the event if specified.

In an exemplary embodiment, the event monitoring unit 214 enables server 102 to receive the defined trip automation rule from the trip automation rule defining unit 212. Server 102 then validates the trip automation rule by comparing the unique identification number associated with the containers 112 and the corresponding monitoring device 114. Upon validation of the event monitoring rule, the event monitoring unit 214 then enables server 102 to follow the trip automation rule. Otherwise, server 102 skips the trip automation processing and generates an alert signal upon a negative matching of the unique identification number associated with the containers 112 and the corresponding monitoring device 114. This negative matching is an indication of the wrong installation of the monitoring device 114 with the defined containers 122, and/or the presence of a wrong container in the defined container group or the absence of a defined container 112 from the defined container group.

The event monitoring unit 214 enables server 102 to extract the monitored location (coordinates) of the containers 112 associated with the shipment from the corresponding monitoring devices 114. Server 102 then monitors the set of data points pertaining to the location of the containers 112 being monitored by the corresponding monitoring devices during the trip. Further, the event monitoring unit 214 enables server 102 to confirm the location and status of the containers 112 by checking the location of the corresponding monitoring device 114 for a predefined number of consecutive data points among the monitored set of data points. In one example, one consecutive data point may be monitored for stops, and two consecutive data points may be monitored for the destination to locate data points for arrival at the stops or destination. Further, two consecutive data points may be monitored for stops, and two consecutive data points may be monitored for the destination to locate data points for departure from the origin or stop location.

Figure 4:
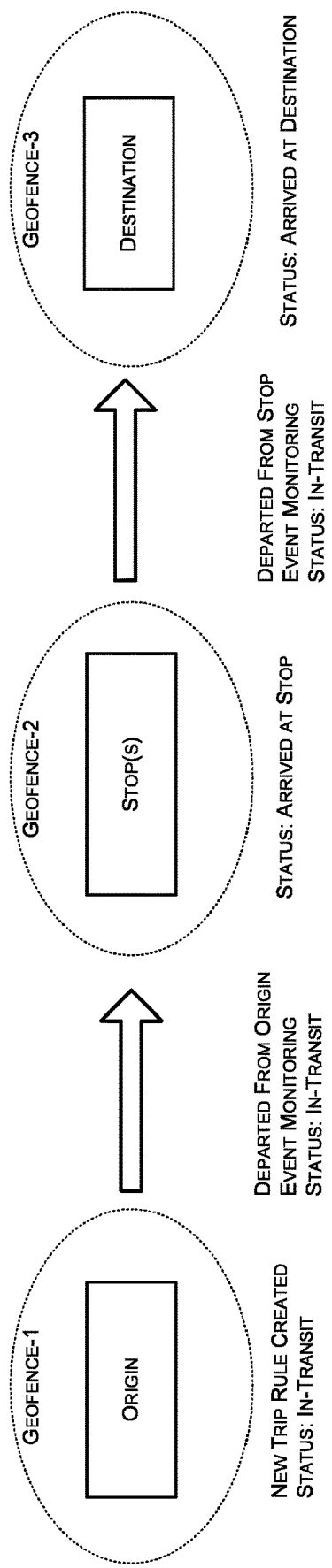
FIG. 4 illustrates an exemplary representation depicting the status of the shipment during the trip in accordance with one or more embodiments of the invention.

Server 102 confirms the location of the containers 112 to be at one of the defined locations (origin, stop, or destination) during the trip when the predefined number of consecutive data points among the monitored set of data points are found to be within the defined geofence (geofence-1 to geofence-3) of the corresponding locations as shown in FIG. 4. In such case, the server 102 notifies the status of the containers 112 to be "arrived at the stop", "arrived at the destination", "departed from the origin", or "departed from the stop" based on the confirmed location. Further, server 102 determines container 112 to be in a transit state when the predefined number of consecutive data points among the received set of data points are found to be outside the geofence of the locations. In such a case, server 102 notifies the status of container 112 to be "in-transit". In addition, the event monitoring unit 214 enables server 102 to determine a halt time of the containers 112 at locations by calculating the total time spent by the corresponding monitoring device 114 across the data points identified within the predefined geofence of the corresponding location. The event status including the location, time stamp, and halt time of the containers 112 is automatically transmitted to the mobile devices 106, 110 of the users 104, and the entities 108, thereby enabling automated and real-time monitoring of the events associated with the shipment. For intermediate stops, the actual arrival and departure time is based on the time stamp of the location data that meets the geofence and halt time conditions. Similarly, at the final destination, the trip's actual arrival time is based on the time stamp of the location data that meets the geofence arrival condition.

In an exemplary embodiment, the attribute monitoring unit 216 enables server 102 to allow the monitoring device 114 to monitor and transmit the attributes of the defined zones of containers 112. Server 102 receives the attributes of the zones, which includes, but is not limited to, temperature, light, humidity, gas composition, and pressure, and the like. The attribute monitoring unit 216 enables server 102 to compare the monitored attributes with the threshold values defined in the trip automation rule. The monitored attributes are automatically transmitted to the mobile devices 106, 110 of the users 104, and the entities 108, thereby enabling automated and real-time event monitoring of the shipment.

In an exemplary embodiment, the alarm unit 218 enables server 102 to generate and transmit a set of alert signals to the mobile devices 106, 110 of the users 104, and the entities 108 when the monitored attributes of zones within the corresponding containers 112 exceed the predefined threshold range for a predefined time. In addition, the alarm unit 218 also enables server 102 to skip the trip automation processing and generate and transmit a set of alert signals to the mobile devices 106, 110 of the users 104 and entities 108 upon a negative matching of the unique identification number associated with the containers 112 and the corresponding monitoring device 114. This alerts the users 104 and entities 108 about the wrong installation of the monitoring device 114 with the defined containers, and/or the presence of a wrong container in the defined container group or the absence of a defined container 112 from the defined container group.

Figure 3:
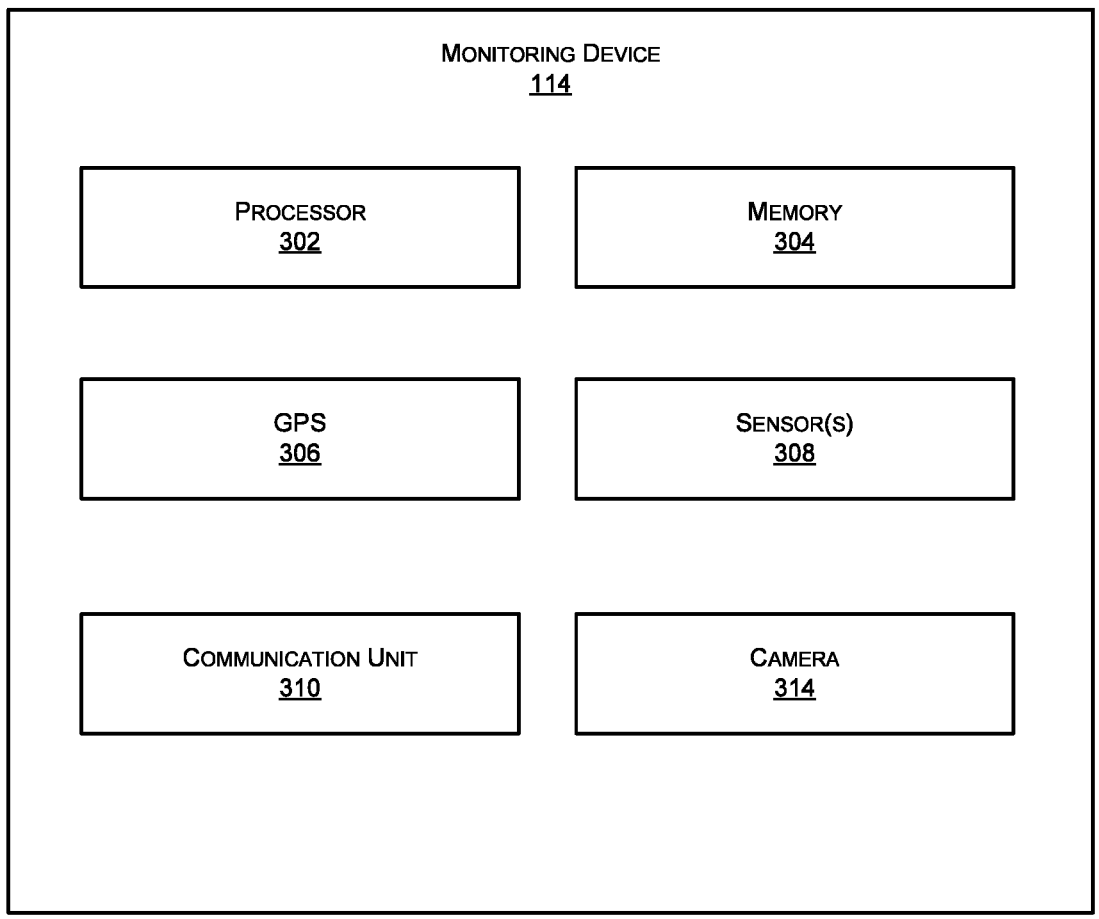
FIG. 3 is a schematic diagram illustrating the block diagram of the monitoring device used in the system in accordance with one or more embodiments of the invention.

Referring to FIG. 3, an exemplary block diagram of the monitoring device 114 installed in containers 112 of the system 100 is illustrated. The monitoring device 114 includes a processor 302, a memory 304, a global positioning system 306 (GPS), a set of sensors 308, and a communication unit 310 (such as a transceiver), being configured within a single housing that can be easily positioned at a required location in the containers. The processor 302 is coupled to the memory 304, the sensors 308, the GPS 306, and the transceiver 310. The processor 302 includes suitable logic, circuitry, and/or interfaces that are operable to execute one or more instructions stored in the memory 304 to perform a predetermined operation. The memory 304 may be operable to store the one or more instructions. The processor 302 may be implemented using the processor 302 known in the art. Some of the commonly known memory 304 implementations include, but are not limited to, a random access memory (RAM), a read only memory (ROM), a hard disk drive (HDD), and a secure digital (SD) card. Further, memory 304 includes the one or more instructions that are executable by the processor 302 to perform specific operations. It is apparent to a person having ordinary skills in the art that the one or more instructions stored in the memory 304 enable the hardware of the mobile device to perform the predetermined operation.

The GPS 306 is configured to monitor the real-time location of the containers where the monitoring device 114 is installed. In some embodiments, the GPS 306 may also monitor the location of the containers 112 at a predefined interval to lower the power consumption of the monitoring device 114. Further, the sensors 308 are configured to monitor the attributes of one or more zones in the containers 112. These attributes can include temperature, light, humidity, gas composition, and pressure, but are not limited to the like. These monitored attributes are indicative of the quality of products or goods being stored in the different zones of the containers 112. The sensors 308 can include temperature sensors, light sensors, humidity sensors, gas sensors, and pressure sensors, but are not limited to the like. The captured location data of the containers 112 and the captured attributes data of the zones of the containers 112 are then transmitted to the server via transceiver 310 for further processing as already explained in detail in FIG. 2.

In some embodiments, the sensors 308 can be distributed at different positions within the zones of containers 112, and these distributed sensors 308 can be operatively connected to the processor 302 of the monitoring device 114 via wired media or wireless media. In other embodiments, all the sensors 308 of the monitoring device 114 can be positioned over a single frame that can be installed in different zones of the containers 112.

In another implementation, the monitoring device 114 can be in form of a monitoring system involving two separate devices, including a location monitoring device (also referred to as gateway device) and an attribute monitoring device (also referred to as remote sensor device). The location monitoring device can include the GPS 306, the transceiver 310, the processor 302, and the memory 304. Further, the attributes monitoring device can include the sensors 308, the transceiver 310, the processor 302, and the memory 304. The location monitoring device and the attributes monitoring device can remain in communication with the server to transmit the location data and attributes data of the container to the server or the user and entity devices in real-time or at a predefined interval to save power consumption.

The communication unit 310 (transceiver 310) transmits and receives messages and data to/from the server 102 and the devices 106, 110 of the users 104/entities 108. Examples of the transceiver 310 may include but are not limited to, an antenna, an Ethernet port, an USB port, or any other port that can be configured to receive and transmit location and attributes data. The transceiver 310 transmits and receives data/messages in accordance with the various communication protocols, such as TCP/IP, UDP, and 2G, 3G, or 4G communication protocols. The monitoring device 114 further includes an image-capturing device such as a camera 314 that may be configured to capture an image of the zones of the containers 112 that may allow the users 104 and the entities 108 to monitor or view the real-time status or images of the zones. The monitoring device 114 further includes a power source such as a battery that is within the housing of the monitoring device 114 to supply electrical power to the components of the monitoring device 114. Besides, the monitoring device 114 may also be electrically connected to a battery of the container.

In one preferred example, the GPS 306 of the monitoring device 114 can capture the location (coordinates) of the container and the GPS data can be directly transmitted to server 102 via the transceiver 310. In another example, the location of container 112 can be captured based on the interaction of a WIFI module of the monitoring device 114 with nearby available WIFI access points. Once the monitoring device 114 comes in a range of any nearby available WIFI access points, the monitoring device 114 determines its location to be the same as the location of the nearby available WIFI access points. In yet another example, the location of container 112 can be captured based on the interaction of the transceiver 310 of the monitoring device 114 with a nearby cellular tower. Once the monitoring device 114 comes into the range of nearby cellular towers, monitoring device 114 determines its location based on corresponding cellular tower triangulation. It should be obvious for a person skilled in the art that the GPS 306 is the primary source for capturing the accurate location of the container, however, the WIFI module and cellular triangulation can be used as secondary sources for determining the location of the container without any limitation.

Figure 5:
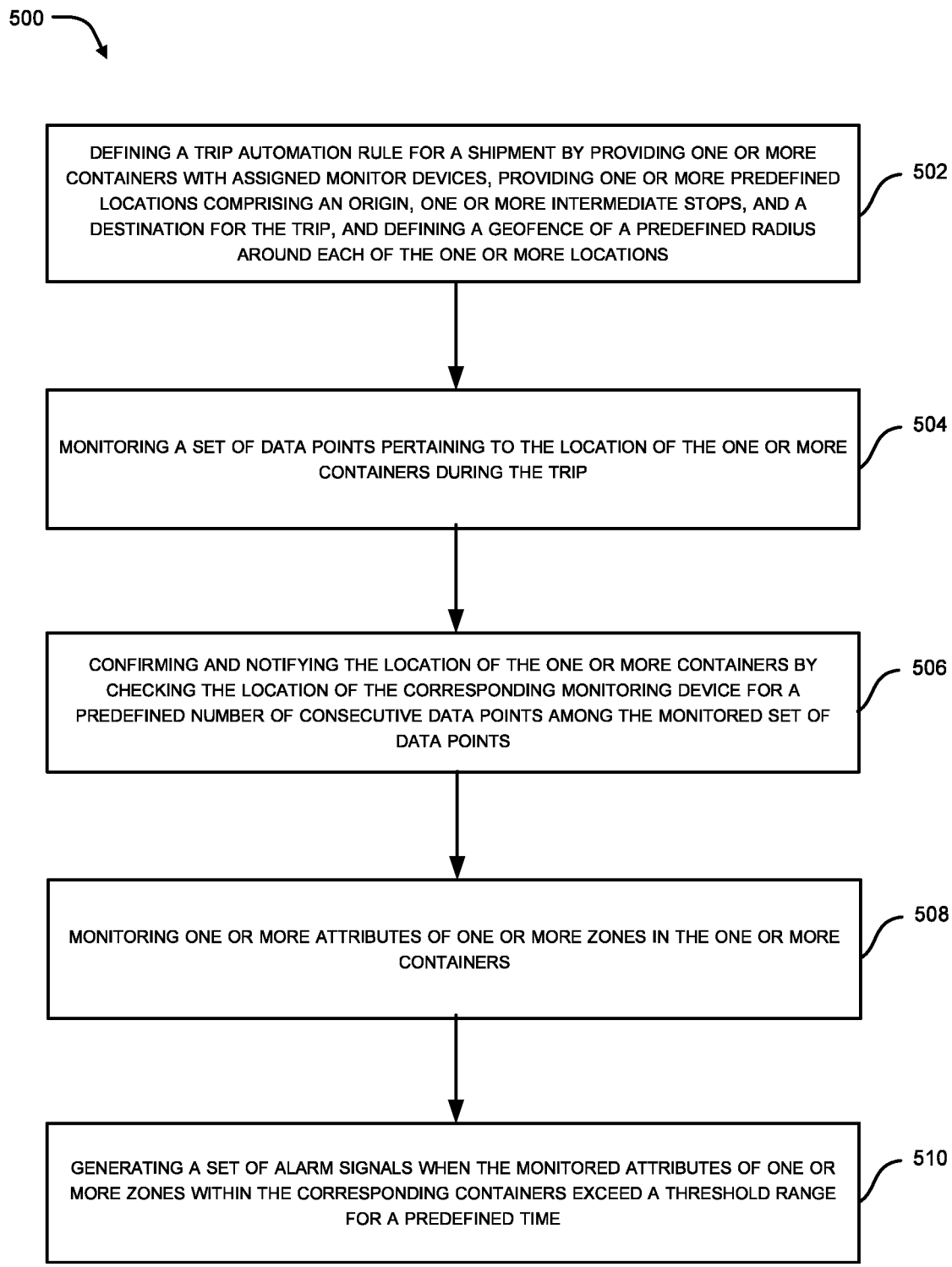
FIG. 5 is a flow diagram illustrating an exemplary embodiment of a method for real-time automation and event monitoring for outbound shipments in accordance with one or more embodiments of the invention.

Referring to FIG. 5, exemplary steps involved in a method for real-time trip automation and event monitoring of shipments are illustrated. Method 500 includes step 502 of defining a trip automation rule for a shipment by assigning one or more containers for the shipment, providing one or more predefined locations such as an origin, one or more intermediate stops, and a destination for the trip, defining a geofence of a predefined radius around each of the locations, and other rules as explained in details in FIG. 2.

Method 500 further includes step 504 of monitoring a set of data points pertaining to the location of the containers during the trip and setting a "time at stop" condition to be met for the one or more containers when the containers stop at the predefined locations, followed by step 506 of confirming and notifying the location of the containers by checking the location of the corresponding monitoring device for a predefined number of consecutive data points among the monitored set of data points. In an exemplary embodiment, the location of the corresponding monitoring device can be checked for two consecutive data points among the last ten monitored data points of the containers, but not limited to the like, to determine the status of the containers.

Accordingly, the location of the containers is confirmed to be at any of the origin, stops, and destination locations when the predefined number of consecutive data points among the monitored set of data points are found to be within the geofence of the corresponding locations. Otherwise, when the predefined number of consecutive data points among the received set of data points are found to be outside the geofence of the locations, the containers are confirmed to be in a transit state and the status is set to be as "in-transit".

Method 500 further includes the step of determining a halt time of the containers at any of the locations by calculating the total time spent by the corresponding monitoring device across the data points identified within the geofence of the corresponding location.

Method 500 includes the steps of checking and validating the trip automation rule before the departure of the containers from any of the locations. The trip automation rule is validated by comparing a unique identification number associated with the containers and the corresponding monitoring device assigned to the containers. For instance, when the unique identification number associated with the containers and the corresponding monitoring device match before departure from the locations, the predefined trip automation rule is followed. However, if the unique identification number associated with the containers and the corresponding monitoring device do not match, the trip automation processing is skipped and an alert signal is generated. This negative matching is an indication of the wrong installation of the monitoring device with the defined containers, and/or the presence of a wrong container in the defined container group or the absence of a defined container from the defined container group.

Method 500 further includes step 508 of monitoring one or more attributes of zones in the containers, followed by step 510 of correspondingly generating a set of alarm signals when the monitored attributes of zones within the corresponding containers exceed a threshold range for a predefined time. The threshold range and the corresponding predefined time are predefined in the trip automation rule prior to the departure of the shipment.

Method 500 further includes the step of transmitting the confirmed location and a corresponding time stamp of the containers to mobile devices associated with the users and entities in real-time or at a predefined time interval. Method 500 further includes the step of transmitting the monitored attributes of the zones of the containers to the mobile devices of the users and entities in real-time or at the predefined time interval.

In an exemplary automation process, once the trip automation rule is defined and prerequisites are met as explained in the above paragraphs of the detailed description, system 100 executes the steps of method 500 of FIG. 5 to automatically build the outbound trip (route) based on the defined trip automation rule and enables real-time event monitoring of the shipment. For instance, as shown in FIG. 4. initially when the container is at the origin, a message is received by the server containing both the location and attributes data from the monitoring device installed in the same container. The server then determines if the trip automation rule applies to the shipment based on the serial number of the monitoring device within the message and its association to the container defined for the container group that is defined in an "active" trip automation rule. Further, if the trip automation rule is found to be valid, the server evaluates the conditions defined in the trip rule. Otherwise, if a trip automation rule is not found, then trip automation processing stops. Furthermore, with a trip automation rule found, the origin departure is evaluated, and the coordinates of the container are evaluated to determine if the container has exited the defined origin or not.

Later on, when the container begins its outbound trip, the server again receives the location and attribute data, and checks the trip automation rule. With a trip automation rule found, the origin departure is evaluated, and the coordinates of the container are evaluated to determine if the container has exited the defined origin. When the server determines the container (i.e. the monitor device) has exited the geofence of the origin, the server looks back at the last 10 data points to get the last known position of the container and determine if the trip start conditions have been met or not. The origin departure settings can preferentially be set at "2 data points" outside the origin geofence.

Further, if the origin departure condition is not met (i.e the last 2 data points are still within the origin geofence), no status is set for the container. However, when the origin departure condition is met (i.e the last 2 data points are outside the origin geofence), the status of the container is set to be "in-transit" and "departed from the origin". At this stage, the server again checks the trip automation rule. Further, the event or attributes monitoring of the zones of the container can take place and the server can notify the users and entities about the container's attributes and location in real-time.

Similarly, the monitoring devices send the location and attributes of the container at predefined interval to the server from the origin to the destination during the outbound trip trip, which allows the server to check the origin departure condition, stop arrival condition, stop departure condition, and destination arrival condition during the outbound trip. The server also checks the trip automation rule every time it receives messages from the monitoring devices and checks if the arrival or departure condition is met once it reaches any of the geofences to determine the status of the container. Finally, once the container's destination arrival condition is met, the server notifies the status of the container as "arrived".

Thus, the invention (system and method) allows users to easily and quickly define trips for outbound shipments, and further allows automatic creation and processing of trips, and enables automated event monitoring for shipments in real-time.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A system for real-time trip automation and event monitoring of shipments, the system comprising:
   one or more containers associated with a shipment, wherein each of the one or more containers contains different zones within the corresponding container;
   two or more monitoring devices assigned to and installed in each of the containers, wherein the monitoring devices are configured to:
      monitor attributes of at least two of the different zones in the corresponding containers, with each monitoring device corresponding to one zone of its container; and
      monitor a location of the corresponding containers; and
   a server in communication with the one or more monitoring devices, wherein the server is configured to:
      receive messages, in real-time, pertaining to the monitored location and attributes data from the one or more monitoring devices;
      check and validate a trip automation rule upon receiving each of the messages from the one or more monitoring devices, by comparing a unique identification number associated with the one or more containers and the corresponding monitoring device;
      follow the trip automation rule upon a positive matching of the unique identification number associated with the one or more containers and the corresponding monitoring device; and
   wherein the server is further configured to skip following the trip automation rule and generate an alert signal when the message is received from a monitoring device that is on a container that is not defined in the trip automation rule.

2. The system of claim 1, wherein the server is further configured to:
receive a set of data packets pertaining to the trip automation rule associated with a trip for the shipment, wherein the trip automation rule is predefined and comprises one or more predefined locations comprising an origin, one or more intermediate stops, and a destination associated with the trip, and a geofence of a predefined radius around each of the one or more predefined locations;
monitor a set of data points pertaining to the location of the one or more containers being monitored by the corresponding monitoring devices during the trip;
confirm and notify the location of the one or more containers by checking the location of the corresponding monitoring device for a predefined number of consecutive data points among the monitored set of data points; and
determine a halt time of the one or more containers at any of the one or more locations by calculating a total time spent by the corresponding monitoring device across the data points identified within the geofence of the corresponding location.

3. The system of claim 2, wherein the server is further configured to confirm the location of the one or more containers to be at one of the one or more locations during the trip when the predefined number of consecutive data points among the monitored set of data points are found to be within the geofence of the corresponding locations.

4. The system of claim 2, wherein the server is further configured to determine the one or more containers to be in a transit state when the predefined number of consecutive data points among a received set of data points is found to be outside the geofence of the one or more locations.

5. The system of claim 1, wherein the trip automation rule comprises:
a threshold range of the attributes for the different zones within the one or more containers,
wherein the different zones correspond to at least one of: a freezer, a cooler, and an ambient zone.

6. The system of claim 1, wherein the system further comprises one or more mobile devices associated with one or more registered users, in communication with the server and the one or more monitoring devices, wherein the one or more mobile devices allow the one or more registered users to:
monitor the attributes of the different zones in the one or more containers; and
monitor the location and a corresponding time stamp of the one or more containers being confirmed and notified by the server during a trip.

7. The system of claim 1, wherein the server is configured to transmit:
a confirmed location and a corresponding time stamp of the one or more containers to one or more mobile devices;
the monitored attributes of the different zones of the one or more containers to the one or more mobile devices in real-time; and
a set of alarm signals to the one or more mobile devices when the monitored attributes of the different zones within the corresponding containers exceed a threshold range for a predefined time.

8. The system of claim 1, wherein the monitoring device comprises:
a positioning unit to monitor a location of the monitoring device at a predefined interval and/or in real-time, wherein the positioning unit is a global positioning system;
one or more sensors to monitor the attributes of the different zones of the one or more containers; and
a communication unit operatively coupled to the positioning unit and the one or more sensors, wherein the communication unit communicatively couples the monitoring device to the server.

9. The system of claim 1, wherein the attributes associated with the different zones comprise one or more of temperature, light, humidity, gas composition, and pressure.

10. A method for real-time trip automation and event monitoring of shipments, the method comprising the steps of:
providing one or more containers associated with a shipment, wherein each of the one or more containers contains different zones within the corresponding container;
providing two or more monitoring devices assigned to and installed in each of the one or more containers;
monitoring attributes of at least two of the different zones in the corresponding containers by the two or more monitoring devices, with each monitoring device corresponding to one zone of its container;
monitoring a location of the corresponding containers by each of the one or more monitoring devices;
receiving, by a server, in real-time, messages pertaining to the monitored location and attributes data from the one or more monitoring devices;
checking and validating a trip automation rule by the server, upon receiving each of the messages from the one or more monitoring devices, by comparing a unique identification number associated with the one or more containers and the corresponding monitoring device;
determining a positive matching of the unique identification number associated with the one or more containers and the corresponding monitoring device;
following, by the server, the trip automation rule upon the positive matching; and
transmitting, by the server, the attributes data, and the locations and corresponding time stamps of the one or more containers, to one or more mobile devices associated with one or more registered users, allowing the one or more registered users to monitor the one or more containers during a trip.

11. The method of claim 10, wherein the method comprises the steps of:
defining the trip automation rule for the shipment by:
providing the one or more containers with assigned monitoring devices;
providing one or more predefined locations comprising an origin, one or more intermediate stops, and a destination for a trip;
defining a geofence of a predefined radius around each of the one or more locations;
monitoring a set of data points pertaining to the location of the one or more containers during the trip;
setting a "time at stop" condition to be met for the one or more containers, wherein the "time at stop" condition is confirmed when the one or more containers stop at the one or more predefined locations; and
confirming and notifying the location of the one or more containers by checking the location of the corresponding monitoring device for a predefined number of consecutive data points among the monitored set of data points.

12. The method of claim 11, wherein the method comprises the steps of:
   confirming and notifying the location of the one or more containers by checking the location of the corresponding monitoring device for two consecutive data points among the set of the last ten monitored data points of the containers; and
   determining a halt time of the one or more containers at any of the one or more locations by calculating a total time spent by the corresponding monitoring device across the data points identified within the geofence of the corresponding location.

13. The method of claim 11, wherein when the predefined number of consecutive data points among the monitored set of data points are found to be within the geofence of one of the one or more locations, the location of the one or more containers is identified and notified to be the corresponding location.

14. The method of claim 11, wherein when the predefined number of consecutive data points among a received set of data points is found to be outside the geofence of the one or more locations, the one or more containers are identified and notified to be departed from the stop and in a transit state.

15. The method of claim 10, wherein the method comprises the step of:
   generating a set of alarm signals when the monitored attributes of the different zones within the corresponding containers exceed a threshold range for a predefined time, wherein the threshold range and the corresponding predefined time are predefined in the trip automation rule.

16. The method of claim 10, wherein the method comprises the steps of:
   transmitting a confirmed location and a corresponding time stamp of the one or more containers to one or more mobile devices associated with a user in real-time or at a predefined time interval; and
   transmitting the monitored attributes of the different zones of the one or more containers to the one or more mobile devices in real-time or at the predefined time interval.

17. A system for real-time trip automation and event monitoring of shipments, the system comprising:
   one or more containers associated with a shipment, wherein each of the one or more containers contains different zones within the corresponding container;
   two or more monitoring devices assigned to and installed in each of the containers, wherein the monitoring devices are configured to:
      monitor attributes of at least two of the different zones in the corresponding containers, with each monitoring device corresponding to one zone of its container; and
      monitor a location of the corresponding containers; and
   a server in communication with the one or more monitoring devices, wherein the server is configured to:
      receive messages, in real-time, pertaining to the monitored location and attributes data from the one or more monitoring devices;
      check and validate a trip automation rule upon receiving each of the messages from the one or more monitoring devices, by comparing a unique identification number associated with the one or more containers and the corresponding monitoring device;
      follow the trip automation rule upon a positive matching of the unique identification number associated with the one or more containers and the corresponding monitoring device; and
   one or more mobile devices associated with one or more registered users, in communication with the server and the one or more monitoring devices, wherein the one or more mobile devices allow the one or more registered users to:
      monitor the attributes of the different zones in the one or more containers; and
      monitor the location and a corresponding time stamp of the one or more containers being confirmed and notified by the server during a trip.

* * * * *